(12) United States Patent
Heo et al.

(10) Patent No.: US 11,955,665 B2
(45) Date of Patent: Apr. 9, 2024

(54) SECONDARY BATTERY AND METHOD FOR MANUFACTURING THE SAME

(71) Applicant: LG Energy Solution, Ltd., Seoul (KR)

(72) Inventors: Ha Young Heo, Daejeon (KR); Duk Hyun Ryu, Daejeon (KR); Hyoung Kwon Kim, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 0 days.

(21) Appl. No.: 17/773,038

(22) PCT Filed: Oct. 29, 2020

(86) PCT No.: PCT/KR2020/014950
§ 371 (c)(1),
(2) Date: Apr. 29, 2022

(87) PCT Pub. No.: WO2021/086078
PCT Pub. Date: May 6, 2021

(65) Prior Publication Data
US 2024/0047838 A1 Feb. 8, 2024

(30) Foreign Application Priority Data

Nov. 1, 2019 (KR) .................. 10-2019-0138987
Oct. 26, 2020 (KR) .................. 10-2020-0139770

(51) Int. Cl.
*H01M 50/538* (2021.01)
*H01M 50/531* (2021.01)
(Continued)

(52) U.S. Cl.
CPC ....... *H01M 50/538* (2021.01); *H01M 50/531* (2021.01); *H01M 50/533* (2021.01); *H01M 50/536* (2021.01); *H01M 50/54* (2021.01)

(58) Field of Classification Search
CPC ............. H01M 50/538; H01M 50/533; H01M 50/536; H01M 50/54; H01M 50/53
See application file for complete search history.

(56) References Cited

U.S. PATENT DOCUMENTS 6,372,380 B1 4/2002 Kitami et al.
7,248,021 B2* 7/2007 Kozu .................. H01M 50/147
320/147

(Continued)

FOREIGN PATENT DOCUMENTS

CN 106463761 A 2/2017
CN 109585908 A 4/2019
(Continued)

OTHER PUBLICATIONS

International Search Report (including partial English translation) and Written Opinion issued in corresponding International Patent Application No. PCT/KR2020/014950 dated Feb. 3, 2021.
(Continued)

*Primary Examiner* — Matthew T Martin
*Assistant Examiner* — Adam J Francis
(74) *Attorney, Agent, or Firm* — Morgan, Lewis & Bockius LLP

(57) ABSTRACT

A secondary battery may include: an electrode assembly in which first and second electrode sheets are stacked and wound with a separation sheet interposed therebetween, wherein a first electrode tab protrudes in the first electrode sheet, and a second electrode tab protrudes in the second electrode sheet; a battery can to accommodate the electrode assembly therein; and a connection part above or below the electrode assembly and facing the electrode assembly, wherein the connection part has a first area made of an electrically conductive gel material; and a second area attached to the first area and made of an electrically insulating material, wherein the second area forms at least a (Continued)

portion of a top surface of the connection part, and at least a portion of the first electrode tab or the second electrode tab is inserted into the first area of the connection part.

15 Claims, 9 Drawing Sheets

(51) Int. Cl.
 *H01M 50/533* (2021.01)
 *H01M 50/536* (2021.01)
 *H01M 50/54* (2021.01)

(56) References Cited

U.S. PATENT DOCUMENTS

| | | | |
|---|---|---|---|
| 2005/0130044 | A1 | 6/2005 | Aoshima et al. |
| 2009/0233159 | A1 | 9/2009 | Phillips et al. |
| 2010/0239897 | A1* | 9/2010 | Sumihara ............ H01M 50/538 |
| | | | 429/94 |
| 2010/0291431 | A1* | 11/2010 | Shih ..................... H01M 6/40 |
| | | | 29/623.2 |
| 2010/0316897 | A1 | 12/2010 | Kozuki et al. |
| 2011/0059352 | A1* | 3/2011 | Lee .................... H01M 50/147 |
| | | | 429/164 |
| 2017/0047575 | A1 | 2/2017 | Tsuji et al. |
| 2019/0348703 | A1 | 11/2019 | Lim et al. |
| 2019/0355958 | A1 | 11/2019 | Tsuji et al. |
| 2020/0020923 | A1* | 1/2020 | Yoshida ............. H01M 50/538 |
| 2020/0235369 | A1* | 7/2020 | Jeong ................ H01M 10/0422 |

FOREIGN PATENT DOCUMENTS

| | | | |
|---|---|---|---|
| CN | 208835176 U | 5/2019 | |
| JP | H10-021953 A | 1/1998 | |
| JP | H10-340737 A | 12/1998 | |
| JP | H11-204095 A | 7/1999 | |
| JP | 2000-311714 A | 11/2000 | |
| JP | 3432171 B2 | 8/2003 | |
| JP | 2012-022955 A | 2/2012 | |
| KR | 10-2004-0092531 A | 11/2004 | |
| KR | 10-2006-0032369 A | 4/2006 | |
| KR | 20060032369 A * | 4/2006 | .......... H01M 50/107 |
| KR | 10-2010-0089092 A | 8/2010 | |
| KR | 10-2010-0139016 A | 12/2010 | |
| KR | 10-2011-0082908 A | 7/2011 | |
| KR | 10-2018-0132242 A | 12/2018 | |
| KR | 10-2019-0040699 A | 4/2019 | |
| WO | 2018/179968 A1 | 10/2018 | |

OTHER PUBLICATIONS

European Search Report issued in corresponding European Patent Application No. 20883246.9 dated Feb. 21, 2023.

* cited by examiner

SECONDARY BATTERY AND METHOD FOR MANUFACTURING THE SAME

CROSS-REFERENCE TO RELATED APPLICATION

The present application claims the benefit of the priority of Korean Patent Application No. 10-2019-0138987, filed on Nov. 1, 2019, and Korean Patent Application No. 10-2020-0139770, filed on Oct. 26, 2020, which are hereby incorporated by reference in their entirety.

TECHNICAL FIELD

The present invention relates to a secondary battery and a method for manufacturing the secondary battery, and more specifically, to a secondary battery, having a structure in which a degree of alignment for an electrode tab may be improved, and a method for manufacturing the same.

BACKGROUND ART

Secondary batteries which are repeatedly chargeable and dischargeable may be classified into cylindrical secondary batteries, prismatic secondary batteries, pouch-type secondary batteries, or the like, depending on manufacturing methods and structures thereof. Among these secondary batteries, such a cylindrical secondary battery generally has a structure, in which an electrode assembly having a jelly-roll shape is accommodated within a cylindrical battery can and a top cap is coupled to an upper portion of the battery can.

In the cylindrical secondary battery according to the related art, a negative electrode tab protruding from the electrode assembly is connected to the battery can, and a positive electrode tap protruding from the electrode assembly is connected to the top cap. Thus, in the cylindrical secondary battery, the battery can has negative polarity, and the top cap has positive polarity.

Also, research for developing a secondary battery, which satisfies a demand for a secondary battery having high output and high capacity, has been actively carried out. To manufacture such a high output and high capacity secondary battery, resistance of the secondary battery needs to be low compared to the related art.

In particular, in the cylindrical secondary battery, an electrode tab bundle protruding from the electrode assembly is required to be formed in plurality to reduce the resistance of the secondary battery. However, when the electrode tab bundle is formed in plurality according to the related art, it is difficult to align the electrode tab bundles, and it is difficult to electrically connect the electrode tab bundles to the battery can or the top cap.

DISCLOSURE OF THE INVENTION

Technical Problem

Thus, an object to be achieved by the present invention is to manufacture a secondary battery which has high output and high capacity by making it easier to align electrode tabs protruding from an electrode assembly compared to the related art and making it easier to establish electrical connection between the electrode tabs and a battery can or between the electrode tabs and a top cap.

Technical Solution

To achieve the object described above, a secondary battery according to the present invention comprises: an electrode assembly having a structure in which a first electrode sheet and a second electrode sheet are stacked and wound with a separation sheet interposed therebetween, wherein a first electrode tab protrudes in the first electrode sheet, and a second electrode tab protrudes in the second electrode sheet; a battery can configured to accommodate the electrode assembly; and a connection part provided above or below the electrode assembly to face the electrode assembly, wherein the connection part comprises: a first area which is made of a gel material having electrical conductivity; and a second area which is attached to the first area and made of a material having electrical insulation, wherein the second area forms at least a portion of a top surface of the connection part, and at least a portion of the first electrode tab or the second electrode tab is inserted into the first area of the connection part.

A beading portion, which has structure in which the battery can is bent inward, may be formed in an upper portion of the battery can, the connection part may be a connection part (hereinafter, referred to as an 'upper connection part') provided above the electrode assembly, the upper connection part may be provided below the beading portion, the second area may form a circumference of the top surface of the upper connection part, and an inner end of the second area may be provided closer to a central axis (A) of the battery can than an inner end of the beading portion.

The connection part may be a connection part (hereinafter, referred to as a 'lower connection part') provided below the electrode assembly, and the lower connection part may be provided in close contact with a bottom surface of the battery can.

The first electrode tab may be provided in plurality to protrude upward from the electrode assembly, and the plurality of first electrode tabs may be inserted into the first area of the upper connection part.

The second electrode tab may be provided in plurality to protrude downward from the electrode assembly, and the plurality of second electrode tabs may be inserted into the first area of the lower connection part.

The second area may form a circumference of the top surface of the lower connection part.

The second area may form the entire top surface of the lower connection part, and the second electrode tabs may pass through the second area of the lower connection part and be inserted into the first area.

The second area further may form the entire bottom surface of the upper connection part, and the first electrode tabs may pass through the second area, which is formed on the bottom surface of the upper connection part, and be inserted into the first area.

The secondary battery may further comprise a CID filter or a safety vent provided above the upper connection part, wherein the first area of the upper connection part is attached to the CID filter or the safety vent and is electrically to the CID filter or the safety vent.

The first electrode tab may protrude while extending lengthwise in a longitudinal direction of the first electrode sheet, and may be wound in the same manner in which the first electrode sheet is wound, and the first electrode tab in a wound state may be inserted into the first area of the upper connection part.

The second electrode tab may protrude while extending lengthwise in a longitudinal direction of the second electrode sheet, and may be wound in the same manner in which the second electrode sheet is wound, and the second electrode tab in a wound state may be inserted into the first area of the lower connection part.

The first area made of a gel material may comprise an organic conductor and a hardening agent, and the first electrode tab or the second electrode tab may be fixed as the first area is hardened by the hardening agent.

Also, a method for manufacturing a secondary battery according to the present invention comprises: a step (a) of manufacturing an electrode assembly by stacking and winding a first electrode sheet and a second electrode sheet with a separation sheet interposed therebetween, wherein a first electrode tab protrudes in the first electrode sheet, and a second electrode tab protrudes in the second electrode sheet; a step (b) of manufacturing a connection part, which comprises a first area that is made of a gel material having electrical conductivity and a second area that is attached to the first area and made of a material having electrical insulation, wherein the second area forms at least a portion of a top surface of the connection part; a step (c) of disposing the connection part both above and below the electrode assembly, inserting at least a portion of the first electrode tab into the first area of the connection part disposed above the electrode assembly, and inserting at least a portion of the second electrode tab into the first area of the connection part disposed below the electrode assembly; and a step (e) of accommodating the electrode assembly in a battery can and coupling a cap assembly to an opening of the battery can, thereby manufacturing the complete secondary battery.

The method may further comprise, between the step (c) and the step (e), a step (d) of hardening the first area of the connection part to fix the first electrode tab or the second electrode tab to the first area.

The first area in the step (b) may be manufactured in a gel state by mixing an organic conductor and a hardening agent, and the first area may be hardened by heat treatment in the step (d).

Advantageous Effects

According to the present invention, the secondary battery may be manufactured, which has high output and high capacity by making it easier to align electrode tabs protruding from an electrode assembly compared to the related art and making it easier to establish electrical connection between the electrode tabs and a battery can or between the electrode tabs and a top cap.

MODE FOR CARRYING OUT THE INVENTION

Figure 1:
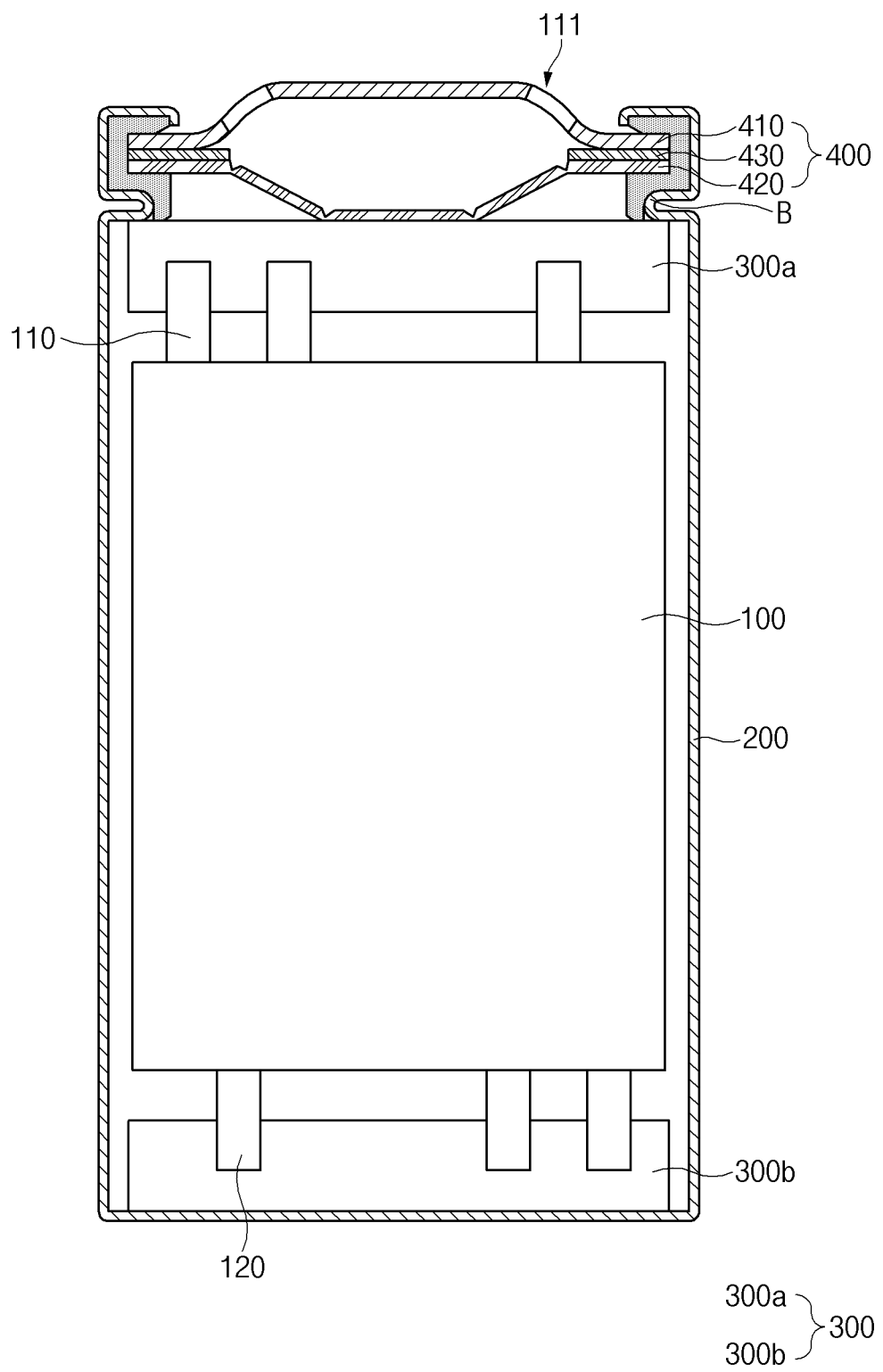
FIG. 1 is a vertical cross-sectional view illustrating a structure of a secondary battery according to the present invention.

Hereinafter, embodiments of the present invention will be described in detail with reference to the accompanying drawings so as to be easily carried out by a person skilled in the art to which the present invention pertains. However, the present invention may be implemented in various different forms, and is not limited to the embodiments described herein. Also, in the drawings, a part irrelevant to the description will be omitted to clearly describe the present invention, and similar elements will be designated by similar reference numerals throughout the specification.

Secondary Battery According to a First Embodiment of the Present Invention

Figure 2:
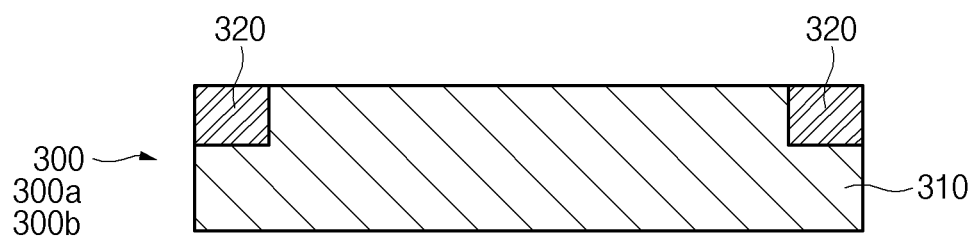
FIG. 2 is a vertical cross-sectional view illustrating structures of an upper connection part and a lower connection part of a secondary battery according to a first embodiment of the present invention.
Figure 3:
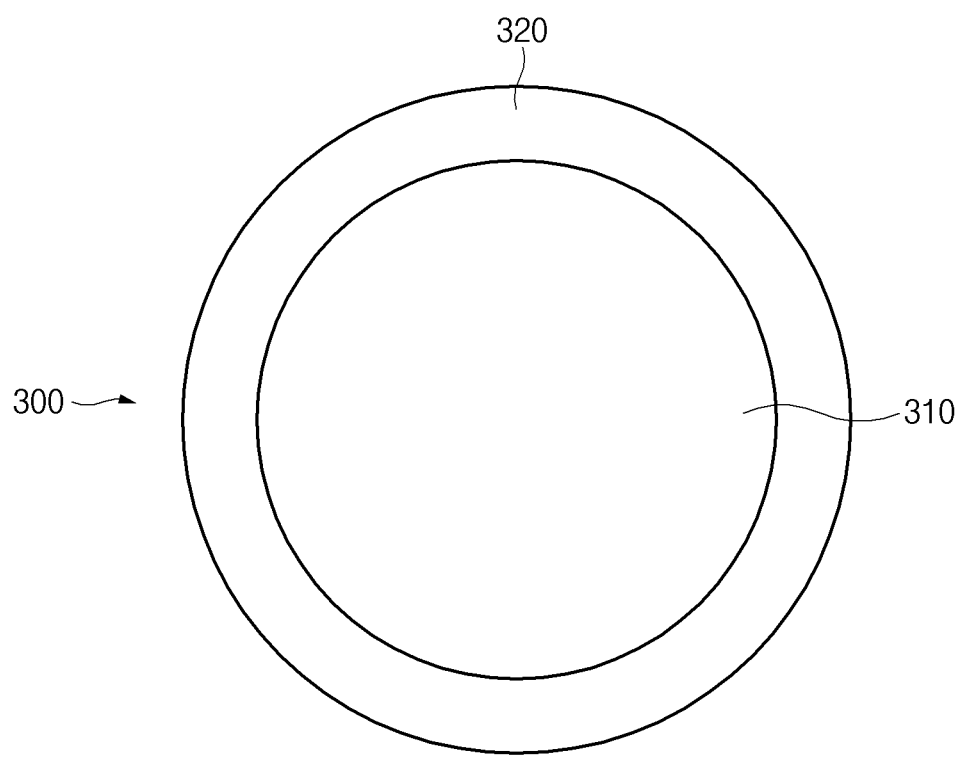
FIG. 3 is a plan view illustrating structures of top surfaces of the upper connection part and the lower connection part of the secondary battery according to the first embodiment of the present invention.

FIG. 1 is a vertical cross-sectional view illustrating a structure of a secondary battery according to the present invention. Also, FIG. 2 is a vertical cross-sectional view illustrating structures of an upper connection part and a lower connection part of a secondary battery according to a first embodiment of the present invention, and FIG. 3 is a plan view illustrating structures of top surfaces of the upper connection part and the lower connection part of the secondary battery according to the first embodiment of the present invention.

As illustrated in FIG. 1, a secondary battery 10 according to the first embodiment of the present invention may comprise an electrode assembly 100. The electrode assembly 100 may have a structure in which electrodes and separator are alternately arranged.

That is, the electrode assembly 100 may be jelly-roll type electrode assembly which is manufactured by alternately disposing an electrode sheet and a separator sheet and then winding same. Also, the electrode assembly 100 may comprise a first electrode tab 110 and a second electrode tab 120 which have a structure protruding outward.

Figure 8:
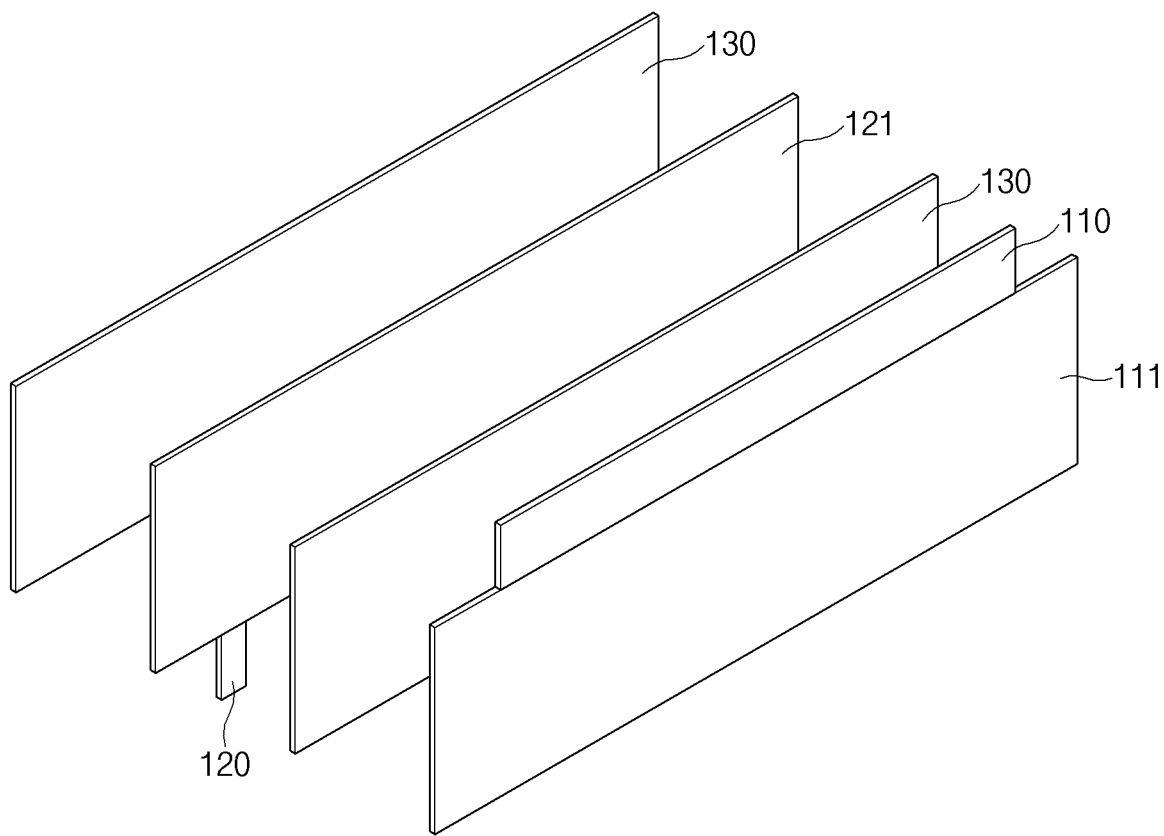
FIG. 8 is a perspective view illustrating a state before a secondary battery according to a fourth embodiment of the present invention is wound.
Figure 9:
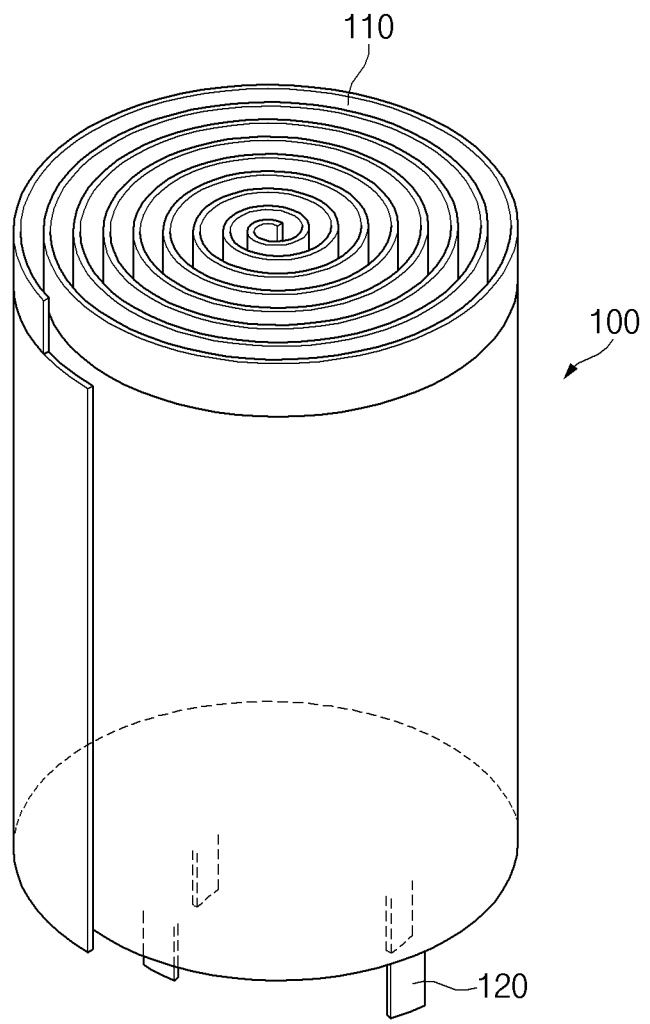
FIG. 9 is a perspective view illustrating a state after the secondary battery according to the fourth embodiment of the present invention is wound.

For example, referring to a portion of FIG. 8, the electrode assembly 100 has a structure in which a first electrode sheet 111 and a second electrode sheet 121 are stacked with a separation sheet 130 therebetween and then wound in a jelly-roll shape. Also, when viewed in FIG. 8, a first electrode tab 110 protrudes from an upper side of the first electrode sheet 111, and a second electrode tab 120 protrudes from a lower side of the second electrode sheet 121.

Here, a first electrode may be a positive electrode, and a second electrode may be a negative electrode. Accordingly, the first electrode sheet may be a positive electrode sheet, and the second electrode sheet is a negative electrode sheet. Also, the first electrode tab is a positive electrode tab, and the second electrode tab is a negative electrode tab. On the contrary to that described above, the first electrode may be a negative electrode, and the second electrode may be a positive electrode.

Hereinafter, the present invention is described with an embodiment in which the first electrode is a positive electrode and the second electrode is a negative electrode.

Also, the secondary battery 10 may further comprise a battery can 200 that accommodates the electrode assembly 100. The battery can 200 may have a cylindrical shape having an open upper portion. That is, the secondary battery according to the present invention may be a cylindrical secondary battery. However, the present invention is not limited to the cylindrical secondary battery but may also be applied to secondary batteries having various structures. For example, the present invention may also be applied to a prismatic secondary battery.

Also, the secondary battery 10 may further comprise a cap assembly 400 coupled to an opening of the battery can 200. The cap assembly 400 comprises a top cap 410, a safety vent 420, and a CID filter 430 provided between the top cap 410 and the safety vent 420.

Here, as illustrated in FIG. 1, the first electrode tab 110 may protrude upward from the electrode assembly 100, and the second electrode tab 120 may protrude downward from the electrode assembly 100.

Also, the secondary battery 10 according to the first embodiment of the present invention may further comprise a connection part 300 which is provided above or below the electrode assembly 100 so as to face the electrode assembly 100. As illustrated in FIG. 1, the connection part 300 may comprise a connection part provided above the electrode assembly 100 and a connection part provided below the electrode assembly 100. In the specification, the connection part provided above the electrode assembly is referred to as an upper connection part 300a, and the connection part provided below the electrode assembly is referred to as a lower connection part 300b.

Also, as illustrated in FIGS. 2 and 3, the connection part according to the present invention may be divided into two or more areas having materials different from each other. In more detail, as illustrated in FIGS. 2 and 3, each of the connection parts 300, 300a, and 300b may comprise a first area 310 and a second area 320 having materials different from each other. Here, the first area 310 may be made of a gel material having electrical conductivity, and the second area 320 may be made of a material having electrical insulation. Also, the second area 320 may be attached to the first area 310.

Also, the second area 320 having the electrical insulation in the connection parts 300, 300a, and 300b may from at least a portion of a top surface of the connection part. For example, as illustrated in FIGS. 2 and 3, the second area 320 may form a circumference of the top surface of the connection parts 300, 300a, and 300b, and the first area 310 may form a central portion of the top surface of the connection parts 300, 300a, and 300b.

Also, in the secondary battery 10 according to the first embodiment of the present invention as illustrated in FIG. 1, at least a portion of the first electrode tab 110 or the second electrode tab 120 may be inserted into the connection part 300. For example, the first electrode tab 110 may be inserted into the upper connection part 300a, and the second electrode tab 120 may be inserted into the lower connection part 300b.

In particular, referring to FIGS. 1 and 2 together, the first electrode tab 110 may be inserted into the first area 310 having the electrical conductivity in the upper connection part 300a, and the second electrode tab 120 may be inserted into the first area 310 having the electrical conductivity in the lower connection part 300b.

The gel is made in such a manner in which a colloidal solution is thickened to a certain concentration or more to form a rigid net structure and then solidified. The gel has an intermediate state between a perfect elastic body and a fluid such as water and oil, and thus may have properties similar to soft jelly.

According to the present invention, since the first electrode tab or the second electrode tab of the electrode assembly may be inserted into the first area of the upper connection part or the lower connection part, the plurality of electrode tabs protruding from the electrode assembly may be easily aligned.

That is, since the first area is made of the gel material as described above, the electrode tab may be easily inserted into the first area when compared to a rigid material. That is, the electrode tab may be inserted into the first area while being embedded or stuck therein. Thus, the electrode tab and the first area may be coupled to each other without a separate additional process such as welding. In particular, when an electrode tab bundle, which is formed by gathering electrode tabs together, is provide in plurality to manufacture a secondary battery having low resistance to exhibit high output and high capacity, the plurality of electrode tab bundles may be inserted into the first area without a separate additional process such as welding, and thus, the secondary battery having high output and high capacity may be manufactured.

According to the present invention as described above, the plurality of the electrode tab bundles may be inserted into the first area. Thus, a section of the first area 310 of the connection part 300, into which the first electrode tab 110 or the second electrode tab 120 is inserted, may be provided in plurality. That is, as illustrated in FIG. 1, a plurality of sections of the first area 310 of the upper connection part 300a, into which first electrode tabs 110 are inserted, may be formed (for example, three sections as illustrated in FIG. 1), and a plurality of sections of the first area 310 of the lower connection part 300b, into which second electrode tabs 120 are inserted, may be formed (for example, three sections as illustrated in FIG. 1).

Referring to FIG. 1 again, a beading portion B, which has a structure in which the battery can 200 is bent inward, may be formed in an upper portion of the battery can 200 in the secondary battery 10 according to the present invention. Here, the upper connection part 300a may be provided below the beading portion B. That is, the upper connection part 300a may be provided between the electrode assembly 100 and the beading portion B.

As described above, the second area 320 having the electrical insulation in the connection part may form at least a portion of the top surface of the connection part, and this may be applied to both the upper connection part 300a and the lower connection part 300b. However, a role of the second area 320 formed in the top surface of the upper connection part 300a may be different from a role of the second area 320 formed in the top surface of the lower connection part 300b.

The second area 320 formed in the top surface of the upper connection part 300a may be configured to prevent the upper connection part 300a from being electrically connected to the battery can.

That is, in the cylindrical secondary battery, the battery can has a second polarity (that is, a negative polarity) because the battery may be electrically connected to the second electrode tab, and the upper connection part 300a has a first polarity (that is, a positive polarity) because the upper connection part 300a is connected to the first electrode tab 110. Thus, it may be required to prevent the battery can 200 and the upper connection part 300a from being electrically connected.

In particular, because the upper connection part 300a is provided adjacent to the beading portion B of the battery can 200 having the inward bent structure when considering the structure of the secondary battery 10 according to the present invention, it may be required to prevent the upper connection part 300a and the battery can 200 from being electrically connected through the beading portion B. Thus, the second area 320 having the electrical insulation in the upper connection part 300a forms the circumference of the top surface of the upper connection part 300a as illustrated in FIG. 2, and thus, the battery can 200 and the upper connection part 300a may be prevented from being electrically connected through the beading portion B. In particular, referring to FIG. 1, an inner end of the second area 320 of the upper connection part 300a may be provided closer to a central axis A of the battery can 200 than an inner end of the beading portion B. In this case, the inner end of the beading portion B may be fundamentally prevented from coming into contact with the first area 310 of the upper connection part 300a. More preferably, a width of the first area 310 of the upper connection part 300a may be greater than a width of the beading portion B.

On the other hand, the second area 320 formed in the top surface of the lower connection part 300b may be configured to prevent the electrode assembly 100 from being directly electrically connected to the lower connection part 300b without going through the second electrode tab 120.

As described above, since the electrode assembly 100 may have a structure in which electrodes and separators are alternately arranged, when the electrode assembly 100 comes into contact with the lower connection part 300b, a first electrode of the electrode assembly may be electrically connected to the lower connection part 300b.

However, since the lower connection part 300b is electrically connected to the second electrode tab 120 and thus has a second polarity (that is, a negative polarity), it may be required to prevent the lower connection part 300b from being electrically connected to the first electrode (that is, the positive electrode).

Thus, the second area 320 formed in the top surface of the lower connection part 300b may be configured to prevent the first electrode and the lower connection part 300b from being electrically connected. That is, since the second area 320 having the electrical insulation is formed in the top surface of the lower connection part 300b, an area in which the electrode assembly 100 may be electrically connected to the lower connection part 300b may be reduced by that amount.

Also, as the first area 310 made of the gel material is hardened, the first electrode tab 110 or the second electrode tab 120 may be fixed to the connection part 300 and not separated therefrom. That is, the first area 310 comprises a hardening agent. That is, as the first area 310 is hardened by the hardening agent, the first electrode tab 110 or the second electrode tab 120 may be fixed to the connection part 300 and not separated therefrom. For example, the first area 310 comprises an organic conductor and a hardening agent. When the first area 310 is heat-treated, the first area 310 is changed to become rigid as the hardening agent is hardened, and as a result, the first electrode tab 110 or the second electrode tab 120 inserted into the connection part 300 may be fixed and not separated. Thus, the first electrode tab or the second electrode tab may be easily inserted into the first area of the connection part 300 while the secondary battery is manufactured, and the first electrode tab or the second electrode tab may be prevented from being separated from the first area of the connection part 300 after the secondary battery is manufactured. As a result, the work efficiency and safety may be enhanced.

Here, the organic conductor may be a silicone conductor that is high or low-temperature hardening silicone, and the hardening agent may be an epoxy resin that makes a change to a thermosetting material. In particular, a material having excellent electrical properties may be selected as the hardening agent, and a rate of change into solid stat may be controlled by adjusting an amount of the added hardening agent contained in the first area.

Hereinafter, a method for manufacturing the secondary battery according to the first embodiment of the present invention will be described.

Figure 4:
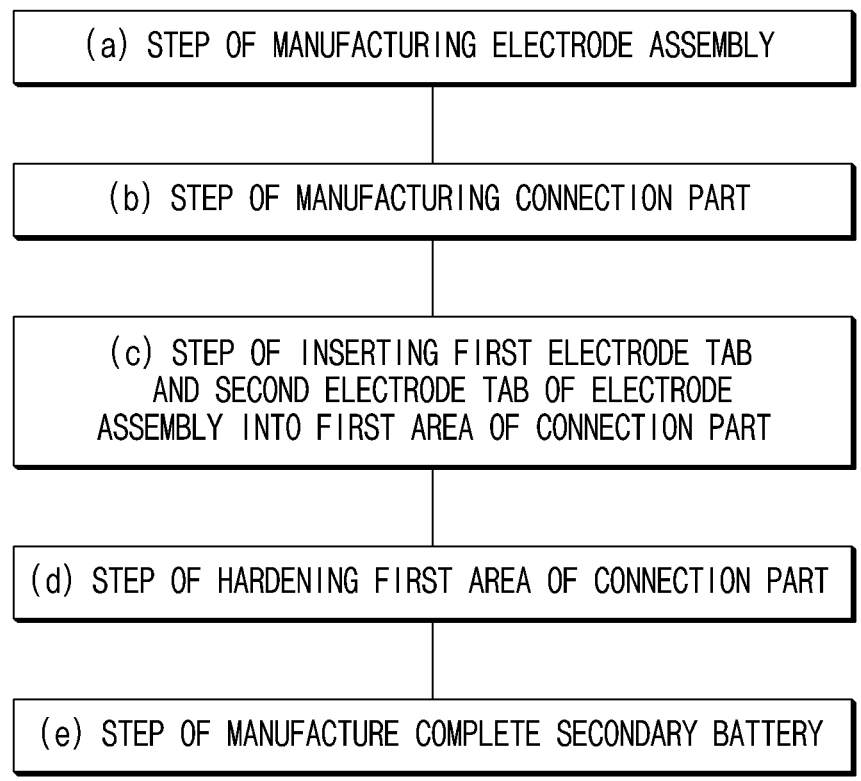
FIG. 4 is a flowchart illustrating a method for manufacturing the secondary battery according to the first embodiment of the present invention.

Method for Manufacturing the Secondary Battery According to the First Embodiment of the Present Invention As illustrated in FIG. 4, a method for manufacturing the secondary battery according to the first embodiment of the present invention comprises a step (a) of manufacturing an electrode assembly, a step (b) of manufacturing a connection part, a step (c) of coupling the connection part and the electrode assembly, a step (d) of hardening the connection part, and a step (e) of manufacturing a complete secondary battery.

In the step (a) of manufacturing an electrode assembly, referring to FIG. 8, the electrode assembly 100 may be manufactured by stacking the first electrode sheet 111 and the second electrode sheet 121 with the separation sheet 130 interposed therebetween and winding the same in a jelly-roll shape. Here, the plurality of first electrode tabs 110 protrude in the first electrode sheet 111 in the longitudinal direction of the first electrode sheet 111, and the plurality of second electrode tabs 120 protrude in the second electrode sheet 121 in the longitudinal direction of the second electrode sheet 121. Here, referring to FIG. 11, the plurality of first electrode tabs 110 and the plurality of second electrode tabs 120 may be arranged along the first electrode sheet or the second electrode sheet wound in a jelly-roll shape.

In the step (b) of manufacturing a connection part, the connection part 300 is manufactured, which is provided with the first area 310 that is made of a gel material having electrical conductivity and the second area 320 that is attached to the first area 310 and made of a material having electrical insulation. Here, the second area 320 forms at least a portion of the top surface of the connection part 300.

Here, the first area 310 is manufactured in a gel state by mixing an organic conductor and a hardening agent. Also, the organic conductor may be a silicone conductor, and the hardening agent may be an epoxy resin.

In the step (c) of coupling a connection part and an electrode assembly, the connection part 300 is disposed both above and below the electrode assembly 100. Here, the connection part disposed above the electrode assembly is referred to as the upper connection part, and the connection part disposed below the electrode assembly is referred to as the lower connection part. Next, at least a portion of the first electrode tab 110 is inserted into the first area 310 of the upper connection part 300a disposed above the electrode assembly 100, and at least a portion of the second electrode tab 120 is inserted into the first area 310 of the lower connection part 300b disposed below the electrode assembly 100.

Here, since the connection part is made of a gel material, the first electrode tab and the second electrode tab may be inserted while being embedded or stuck, even though there is no groove.

In the step (d) of hardening a connection part, the first electrode tab 110 or the second electrode tab 120 is fixed to the first area 310 and not separated therefrom by hardening the first area 310 of the connection part 300. That is, the first area may be made rigid by hardening the hardening agent contained in the first area 310 through heat treatment, and accordingly, the first electrode tab 110 or the second electrode tab 120 inserted into the first area 310 may be fixed and not separated.

In the step (e) of manufacturing a complete secondary battery, the electrode assembly 100, to which the connection part is coupled, is accommodated in the battery can 200, and the cap assembly 400 is coupled to the opening of the battery can 200.

Thus, the complete secondary battery 10 illustrated in FIG. 1 may be manufactured.

Hereinafter, in describing another embodiment of the present invention, components having the same functions as those in the foregoing embodiment are given the same reference numerals, and their duplicated descriptions will be omitted.

Secondary Battery According to a Second Embodiment of the Present Invention

Figure 5:
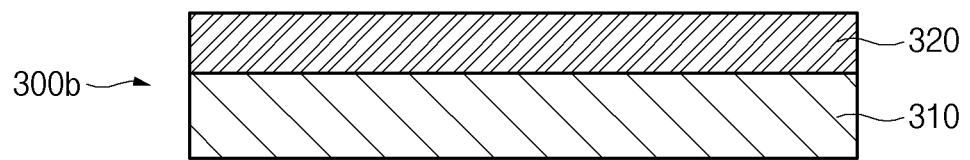
FIG. 5 is a vertical cross-sectional view illustrating a structure of a lower connection part of a secondary battery according to a second embodiment of the present invention.
Figure 6:
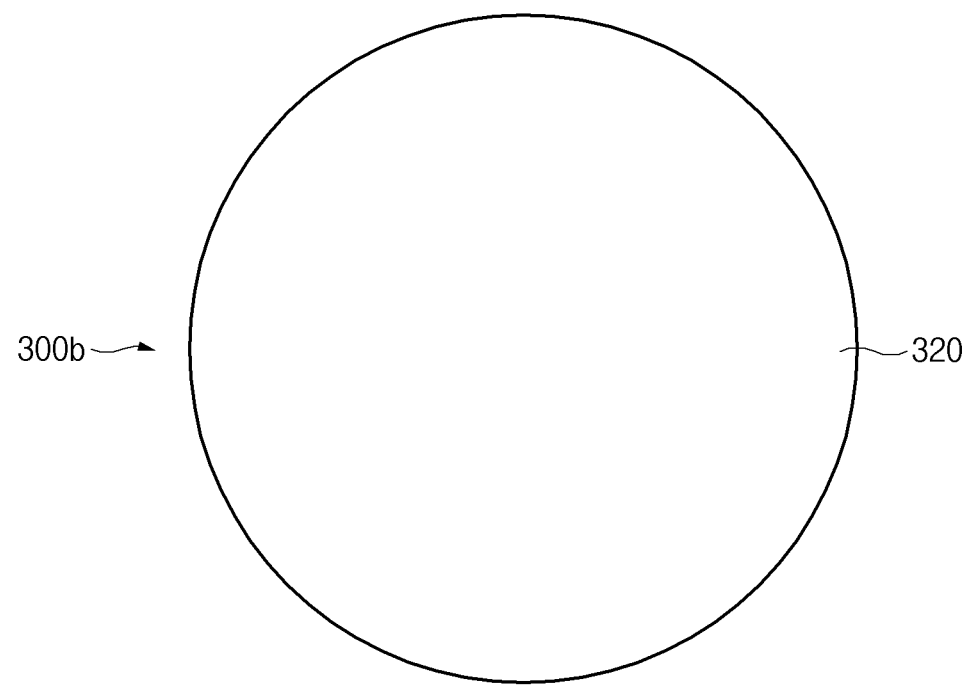
FIG. 6 is a plan view illustrating a structure of a top surface of the lower connection part of the secondary battery according to the second embodiment of the present invention.

FIG. 5 is a vertical cross-sectional view illustrating a structure of a lower connection part of a secondary battery according to a second embodiment of the present invention, and FIG. 6 is a plan view illustrating a structure of a top surface of the lower connection part of the secondary battery according to the second embodiment of the present invention.

According to the first embodiment of the present invention as illustrated in FIGS. 2 and 3, the second area 320 may form the circumference of the top surface of the lower connection part 300b. However, according to the second embodiment of the present invention as illustrated in FIGS. 5 and 6, a second area 320 may form the entire top surface of the lower connection part 300b. In this case, the electrode assembly 100 may be more effectively prevented from being directly electrically connected to the lower connection part 300b without going through the second electrode tab 120 (see FIG. 1).

Here, in a case in which the second area 320 having electrical insulation forms the entire top surface of the lower connection part 300b as in the second embodiment of the present invention, the second electrode tab 120 (see FIG. 1) may pass through the second area 320 of the lower connection part 300b and be inserted into the first area 310.

Referring to FIG. 1 again, the lower connection part 300b in the secondary battery 10 according to the present invention may be provided in close contact with a bottom surface of the battery can 200. More preferably, the lower connection part 300b may be attached to the bottom surface of the battery can 200. Thus, the lower connection part 300b may be electrically connected to the battery can 200, and as a result, the battery can may have the second polarity.

As described above, the battery can of the cylindrical secondary battery has the second polarity. According to the related art, as the second electrode tab or second electrode tab bundle of the electrode assembly was bonded to the bottom surface of the battery can, the battery can had the second polarity. In this case, a separate process of welding the second electrode tab to the bottom surface of the battery can was required. In particular, for the secondary battery in which a plurality of second electrode tab bundles are formed to obtain high output and high capacity, a plurality of sections on the bottom surface of the battery can, to which the second electrode tab bundles are welded, were formed. Thus, a welding process became complicated, and the bottom surface of the battery can was damaged by the welding process.

However, according to the present invention, the lower connection part, into which the second electrode tab is inserted, is brought into close contact with or attached to the bottom surface of the battery can, without a separate process of welding the second electrode tab or the second electrode tab bundles to the bottom surface of the battery can. Thus, the secondary battery, in which the plurality of second electrode tab bundles are formed, may be easily manufactured while avoiding the damage to the bottom surface of the battery can.

Here, the secondary battery 10 according to the present invention may be a cylindrical secondary battery, and thus further comprise a cap assembly 400 which is provided with a top cap 410, a CID filter 430, and a safety vent 420. The CID filter 430 or the safety vent 420 may be provided above the upper connection part 300a.

The CID filter 430 may be configured to interrupt electrical current of the secondary battery when the internal temperature of the secondary battery increases. Also, the safety vent 420 may be configured to be ruptured when the internal pressure of the secondary battery increases, and thus, a gas inside the secondary battery is discharged.

According to the present invention, the first area 310 of the upper connection part 300a may be attached to the CID filter 430 or the safety vent 420. Thus, the upper connection part 300a may be electrically connected to the CID filter 430 or the safety vent 420.

The first electrode tab of the electrode assembly in the cylindrical secondary battery is electrically connected to the CID filter or the safety vent, and thus, the CID filter or the safety vent may have the first polarity (that is, the positive polarity). For this, according to the related art, the first electrode tab was attached to the CID filter or the safety vent through welding.

However, according to the related art, as in the second electrode tab, a separate process of welding the first electrode tab to the CID filter or the safety vent was required. For the secondary battery in which a plurality of first electrode tab bundles are formed to obtain high output and high capacity, a plurality of sections on the CID filter or the safety vent, to which the first electrode tab bundles are welded, were formed. Thus, a welding process became complicated, and the CID filter or the safety vent was damaged by the welding process.

However, according to the present invention, the first electrode tab or the first electrode tab bundles may be electrically connected to the CID filter (or the safety vent) without a separate process of welding the first electrode tab or the first electrode tab bundles to the CID filter or the safety vent. Thus, the secondary battery, in which the plurality of first electrode tab bundles are formed, may be easily manufactured while avoiding the damage to the CID filter or the safety vent.

Secondary Battery According to a Third Embodiment of the Present Invention

Figure 7:
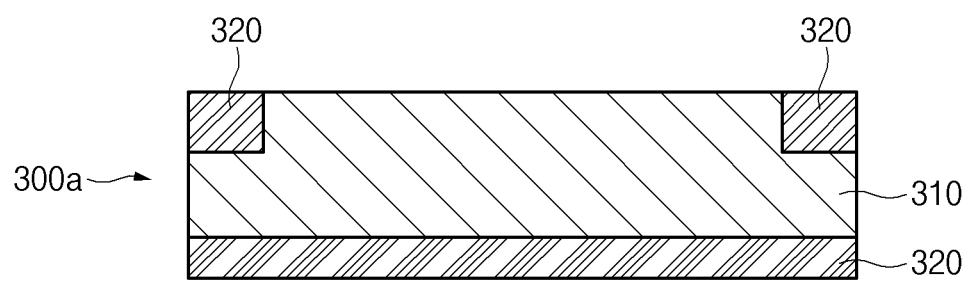
FIG. 7 is a vertical cross-sectional view illustrating a structure of an upper connection part of a secondary battery according to a third embodiment of the present invention.

FIG. 7 is a vertical cross-sectional view illustrating a structure of an upper connection part of a secondary battery according to a third embodiment of the present invention.

According to the third embodiment of the present invention, a second area 320 in an upper connection part 300a may not only form at least a portion of a top surface of the upper connection part 300a, but also further form at least a portion of a bottom surface.

More preferably, according to the third embodiment of the present invention, the second area 320 may further form the entire bottom surface of the upper connection part 300a. In this case, the first electrode tab protruding upward from the electrode assembly may pass through the second area 320 formed in the bottom surface of the upper connection part 300a and be inserted into the first area 310.

When the second area 320 forms the entire bottom surface of the upper connection part 300a according to the third embodiment of the present invention, as in the second embodiment of the present invention, the electrode assembly 100 may be more effectively prevented from being directly electrically connected to the upper connection part 300a without going through the first electrode tab 110 (see FIG. 1).

Also, although not illustrated in the drawing, when the second area 320 forms the circumference of the top surface of the lower connection part 300b according to the first embodiment of the present invention, a portion of the top surface of the lower connection part 300b in which the second area 320 is formed may further protrude upward than a portion of the top surface of the lower connection part 300b in which the first area 310 is formed. In this case, the electrode assembly 100 comes into contact with the second area 320 of the lower connection part 300b before coming into direct contact with the first area 310, and thus, the lower connection part 300b and the electrode assembly 100 may be prevented from being directly electrically connected without going through the second electrode tab 120 (see FIG. 1).

Also, although not illustrated in the drawing, when the second area 320 is formed in only a portion of the bottom surface of the upper connection part 300a according to the third embodiment of the present invention, a portion of the bottom surface of the upper connection part 300a in which the second area 320 is formed may further protrude downward than a portion of the bottom surface of the upper connection part 300a in which the first area 310 is formed. In this case, the electrode assembly 100 comes into contact with the second area 320 of the upper connection part 300a before coming into direct contact with the first area 310, and thus, the upper connection part 300a and the electrode assembly 100 may be effectively prevented from being directly electrically connected without going through the first electrode tab 110 (see FIG. 1).

Secondary Battery According to a Fourth Embodiment of the Present Invention

As illustrated in FIGS. 8 to 11, a secondary battery according to the fourth embodiment of the present invention has a structure in which a first electrode sheet 111 and a second electrode sheet 121 are stacked with a separation sheet 130 therebetween and then wound in a jelly-roll shape. Also, a first electrode tab 110 protrudes in the first electrode sheet 111, and a second electrode tab 120 protrudes in the second electrode sheet 121.

Figure 10:
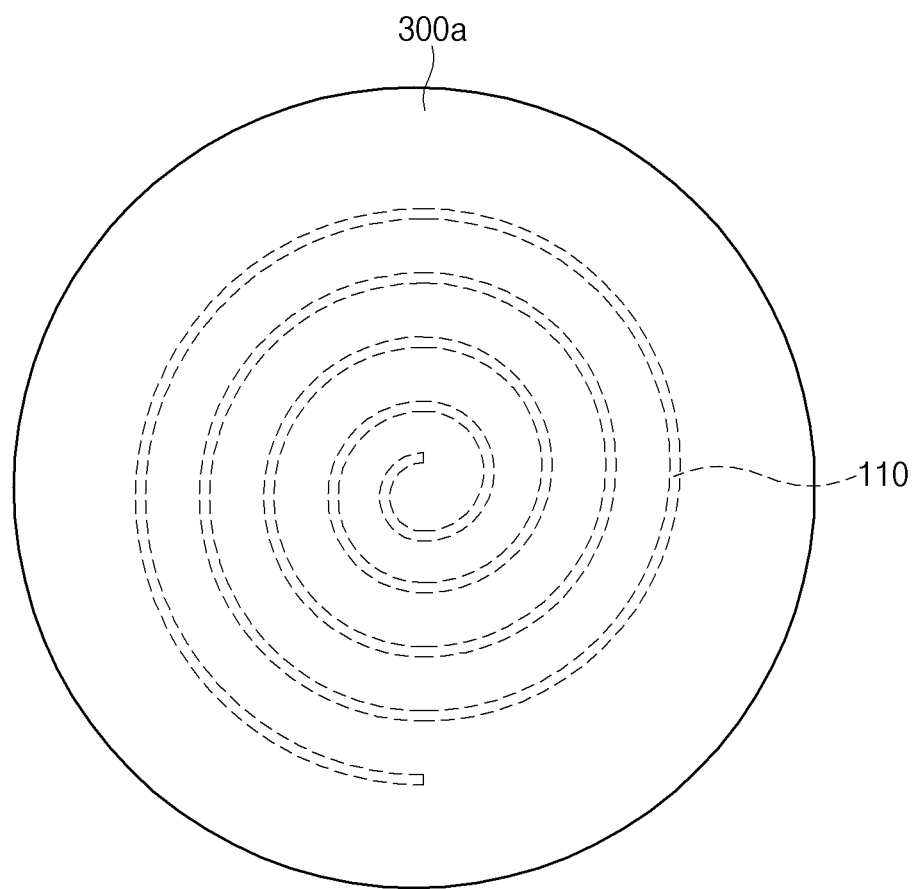
FIG. 10 is a plan view of FIG. 9.

Here, the first electrode tab 110 protrudes while extending lengthwise in a longitudinal direction of the first electrode sheet 111 (that is, when viewed in FIG. 8, one first electrode tab extends lengthwise on the top surface of the first electrode sheet in the left and right direction of the first electrode sheet), and is wound in the same jelly-roll shape as the first electrode sheet wound in the jelly-roll shape as illustrated in FIG. 10. The first electrode tab having the structure described above is wound in the jelly-roll shape and inserted into the first area 310 of the upper connection part 300a. Accordingly, even when the length of the first electrode tab significantly increases, the first electrode tab may be effectively inserted into the first area.

Here, the second electrode tab 120 may be formed in the same jelly-roll shape as the first electrode tab wound in the jelly-roll shape, and inserted into the lower connection part. That is, the second electrode tab 120 protrudes while extending lengthwise in a longitudinal direction of the second electrode sheet 121, and is wound in the same jelly-roll shape as the second electrode sheet wound in the jelly-roll shape. The second electrode tab having the structure described above is wound in the jelly-roll shape and inserted into the first area of the lower connection part. Accordingly, even when the length of the second electrode tab significantly increases, the second electrode tab may be effectively inserted into the first area.

Figure 11:
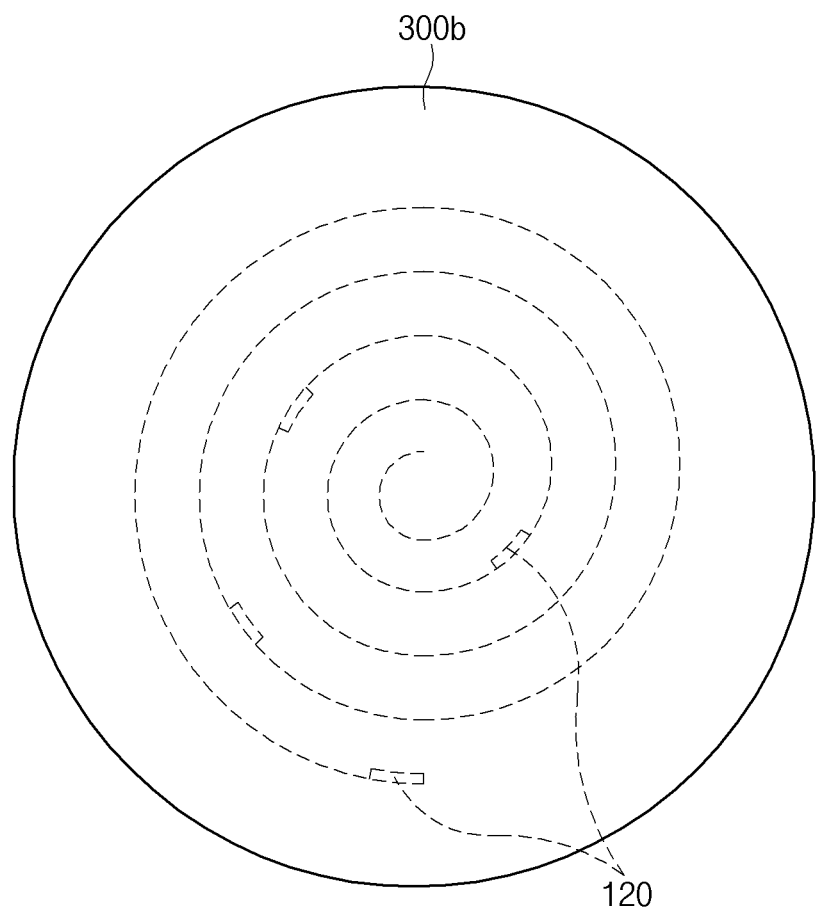
FIG. 11 is a bottom view of FIG. 9.

Also, the first electrode tab may be formed to be wound in the jelly-roll shape as illustrated in FIG. 10, and the second electrode tab may be provided in plurality as illustrated in FIG. 11. Also, the formation described above may be made in opposite manner.

Here, the first to fourth embodiments of the present invention described above may be implemented in their own form, but may be mixed and used for implementing one secondary battery. That, for example, in the secondary battery according to the present invention, the connection part according to the first embodiment of the present invention may be used as the upper connection part 300a, and the connection part according to the second embodiment of the present invention may be used as the lower connection part 300b.

Battery Pack

A battery pack according to the present invention may be provided with a plurality of secondary batteries. Description of the secondary batteries provided in the battery pack according to the present invention will be substituted by the earlier description of the secondary battery of the present invention.

Although the present disclosure is described by specific embodiments and drawings as described above, the present disclosure is not limited thereto, and it is obvious that various changes and modifications may be made by a person skilled in the art to which the present disclosure pertains within the technical idea of the present disclosure and equivalent scope of the appended claims.

DESCRIPTION OF THE SYMBOLS

10: Secondary battery
100: Electrode assembly
110: First electrode tab
120: Second electrode tab
200: Battery can
300: Connection part
300a: Upper connection part
300b: Lower connection part
310: First area
320: Second area
A: Central axis of battery can
B: Beading portion

The invention claimed is:

1. A secondary battery comprising:
an electrode assembly having a structure in which a first electrode sheet and a second electrode sheet are stacked and wound with a separation sheet interposed therebetween, wherein a first electrode tab protrudes in the first electrode sheet, and a second electrode tab protrudes in the second electrode sheet;
a battery can configured to accommodate the electrode assembly therein; and
a connection part provided above or below the electrode assembly and facing the electrode assembly,
wherein the connection part comprises:
a first area made of an electrically conductive gel material; and
a second area attached to the first area and made of an electrically insulating material, and
wherein the second area forms at least a portion of a top surface of the connection part, and at least a portion of the first electrode tab or the second electrode tab is inserted into the first area of the connection part.

2. The secondary battery of claim 1, wherein a beading portion, which has structure in which the battery can is bent inward, is formed in an upper portion of the battery can,
wherein the connection part is an upper connection part provided above the electrode assembly,
wherein the upper connection part is provided below the beading portion,
wherein the second area forms a circumference of the top surface of the upper connection part, and
wherein an inner end of the second area is provided closer to a central axis (A) of the battery can than an inner end of the beading portion.

3. The secondary battery of claim 1, wherein the connection part is a lower connection part provided below the electrode assembly, and
wherein the lower connection part is provided in close contact with a bottom surface of the battery can.

4. The secondary battery of claim 2, wherein the first electrode tab is provided in plurality to protrude upward from the electrode assembly, and
wherein the plurality of first electrode tabs are inserted into the first area of the upper connection part.

5. The secondary battery of claim 3, wherein the second electrode tab is provided in plurality to protrude downward from the electrode assembly, and
wherein the plurality of second electrode tabs are inserted into the first area of the lower connection part.

6. The secondary battery of claim 3, wherein the second area forms a circumference of the top surface of the lower connection part.

7. The secondary battery of claim 5, wherein the second area forms the entire top surface of the lower connection part, and
wherein the second electrode tabs pass through the second area of the lower connection part and are inserted into the first area.

8. The secondary battery of claim 4, wherein the second area further forms the entire bottom surface of the upper connection part, and
wherein the first electrode tabs pass through the second area, which is formed on the bottom surface of the upper connection part, and are inserted into the first area.

9. The secondary battery of claim 2, further comprising a CID filter or a safety vent provided above the upper connection part,
wherein the first area of the upper connection part is attached to the CID filter or the safety vent and is electrically to the CID filter or the safety vent.

10. The secondary battery of claim 2, wherein the first electrode tab protrudes while extending lengthwise in a longitudinal direction of the first electrode sheet, and is wound in the same manner in which the first electrode sheet is wound, and
wherein the first electrode tab in a wound state is inserted into the first area of the upper connection part.

11. The secondary battery of claim 3, wherein the second electrode tab protrudes while extending lengthwise in a longitudinal direction of the second electrode sheet, and is wound in the same manner in which the second electrode sheet is wound, and
wherein the second electrode tab in a wound state is inserted into the first area of the lower connection part.

12. The secondary battery of claim 1, wherein the first area made of a gel material comprises an organic conductor and a hardening agent, and
wherein the first electrode tab or the second electrode tab is fixed to the first area by hardening the hardening agent.

13. A method for manufacturing a secondary battery, the method comprising:
a step (a) of manufacturing an electrode assembly by stacking and winding a first electrode sheet and a second electrode sheet with a separation sheet interposed therebetween, wherein a first electrode tab protrudes in the first electrode sheet, and a second electrode tab protrudes in the second electrode sheet;
a step (b) of manufacturing a connection part, which comprises a first area that is made of an electrically conductive gel material and a second area that is attached to the first area and made of electrically insulating material, wherein the second area forms at least a portion of a top surface of the connection part;
a step (c) of disposing the connection part both above and below the electrode assembly, inserting at least a portion of the first electrode tab into the first area of the connection part disposed above the electrode assembly, and inserting at least a portion of the second electrode tab into the first area of the connection part disposed below the electrode assembly; and
a step (e) of accommodating the electrode assembly in a battery can and coupling a cap assembly to an opening of the battery can.

14. The method of claim 13, further comprising, between the step (c) and the step (e), a step (d) of hardening the first area of the connection part to fix the first electrode tab or the second electrode tab to the first area.

15. The method of claim 14, wherein the first area in the step (b) is manufactured in a gel state by mixing an organic conductor and a hardening agent, and the first area is hardened by heat treatment in the step (d).

* * * * *